(12) United States Patent
Wintrell

(10) Patent No.: US 6,519,942 B2
(45) Date of Patent: Feb. 18, 2003

(54) SYSTEMS AND METHODS FOR HARVESTING ENERGY FROM DIRECT IRON-MAKING OFF GASES

(76) Inventor: Reginald Wintrell, 1092 S. Lyndwood Dr., Orem, UT (US) 84097-6619

( * ) Notice: Subject to any disclaimer, the term of this patent is extended or adjusted under 35 U.S.C. 154(b) by 0 days.

(21) Appl. No.: 09/768,192

(22) Filed: Jan. 23, 2001

(65) Prior Publication Data

US 2002/0095938 A1 Jul. 25, 2002

(51) Int. Cl.[7] .............................. F02B 43/00; F02C 4/18
(52) U.S. Cl. ......................... 60/772; 60/780; 60/39.12; 60/39.182
(58) Field of Search ........................ 60/772, 780, 781, 60/39.12, 39.15, 39.182

(56) References Cited

U.S. PATENT DOCUMENTS

| | | | |
|---|---|---|---|
| 4,509,177 A | * | 4/1985 | Fey .............................. 373/102 |
| 5,055,131 A | * | 10/1991 | Lehto .......................... 208/426 |
| 5,066,325 A | * | 11/1991 | Lehto .......................... 208/426 |
| 5,643,354 A | | 7/1997 | Agrawal et al. |
| 5,685,524 A | | 11/1997 | Jaffre et al. |
| 5,700,308 A | | 12/1997 | Pal et al. |
| 5,741,349 A | | 4/1998 | Hubble et al. |
| 5,811,057 A | | 9/1998 | Hubble et al. |
| 5,827,473 A | | 10/1998 | den Hartog |
| 5,989,307 A | | 11/1999 | den Hartog |
| 6,045,602 A | | 4/2000 | Shah et al. |
| 6,152,984 A | | 11/2000 | Drnevich |
| 6,171,364 B1 | | 1/2001 | Sarma et al. |

* cited by examiner

Primary Examiner—Charles G. Freay
(74) Attorney, Agent, or Firm—Thorpe North & Western, LLP

(57) ABSTRACT

The present invention provides devices and methods for increasing the efficiency and economy of direct iron making processes. In one aspect, the energy contained in off gases produced during a direct iron making process may be utilized in a variety of ways to generate electricity. In another aspect, the off gases may be used to control the pressure in the reaction vessel and increase reaction rates and productivity. In yet another aspect, the sulfur content of the off gases is lowered which reduces the amount of scrubbing required before emission into the atmosphere.

20 Claims, 2 Drawing Sheets

SYSTEMS AND METHODS FOR HARVESTING ENERGY FROM DIRECT IRON-MAKING OFF GASES

FIELD OF THE INVENTION

The present invention relates generally to systems and methods for harvesting energy contained in the off gases resulting from a direct iron making process or smelter. More particularly, the present invention relates to systems and methods of generating electricity using the off gases of the direct iron making process.

BACKGROUND OF THE INVENTION

Various environmental and economic pressures are currently being exerted upon the iron and steel making industry to develop a direct iron making process that utilizes coal and other fuels, instead of coke, for the conversion of iron ores to liquid iron. Various direct iron making processes are known to those skilled in the art, and several are currently being developed and commercialized in various countries, such as the Australian HIsmelt and Ausi-Melt, the Dutch Cyclonic Converter Furnace, the Italian CleanSmelt, the Russian Romelt, and the United States A.I.S.I. process.

Several of the above-recited processes have been successful in producing iron and other hot metals by using coal rather than coke. However, most of the processes are very inefficient, because they produce large quantities of high temperature off gases that contain as much as 50% of the charged fuel energy.

Additionally, most of the known direct iron making processes require careful control of the pressure range at which the conversion from ore to liquid metal is carried out. Such pressures are generally above atmospheric pressure, and therefore, require additional pressure creating and controlling equipment. As such, methods of increasing the efficiency and economy of direct iron making processes are continually being sought.

SUMMARY OF THE INVENTION

Accordingly, the present invention provides a method of harvesting energy contained in off gases resulting from a direct iron making process or smelter which harvests the heat, pressure, and chemical energy of the off gases. The process includes the steps of: a) transferring heat energy from the direct iron making off gases to water, such that the water becomes steam and turns a steam turbine coupled to a power generator that produces electricity; b) transferring pressure energy from the direct iron making off gases to a power recovery expander coupled to a power generator, such that the generator produces electricity; and c) transferring chemical energy from the direct iron making off gases to water by combusting the off gases, such that the water heats to steam, and turns a steam turbine coupled to a power generator that produces electricity. In one aspect, the step of transferring heat energy to the water includes transferring a sufficient amount of heat energy to superheat the water.

In another aspect, the present method may further include the steps of: a) converting the superheated water to saturated steam; b) super heating the saturated steam in the super heater; and c) turning a steam turbine connected to a power generator with the super heated steam to generate electricity.

In yet another aspect, the step of super heating further includes transferring chemical energy from the off gases to the saturated steam in the form of heat by combusting the off gases.

In addition to the above recited aspects, the present method may include removing particulate matter from the off gas prior to the step of transferring pressure energy. In one aspect, the particulate matter may be removed using a cyclone dust extractor. In another aspect, an electrostatic precipitator may be used. Additionally, other forms of conventional particulate or dust removal equipment may be used.

The present method may also include the step of scrubbing the off gases following the combustion step to remove sulfur. In one aspect, the scrubbing may be a wet scrubbing. In another aspect, the scrubbing may be a dry scrubbing.

In addition to a method for harvesting energy from off gases, the present invention encompasses a system for performing such a process. In one aspect, such a system may include: a) a steam hood, operatively coupled to a direct iron making smelter, configured to transfer heat energy from the off gases into water and create steam; b) a steam turbine, operatively coupled to the steam hood and to a power generator, configured to receive steam from the steam hood, and generate electricity with the power generator; c) a power recovery expander, operatively coupled to the steam hood and to a power generator, configured to receive the off gases from the steam hood to condition the gases by means of conventional cooling system, if required, and to transfer pressure energy from the off gases to the power generator and generate electricity; d) a boiler unit, operatively coupled to the power recovery expander, configured to receive the low pressure off gases from the power recovery expander, and to transfer chemical energy from the off gases to water in the boiler unit in the form of heat, by combusting the off gases; and e) a steam turbine and power generator, coupled to the boiler unit, configured to receive steam from the boiler unit and generate electricity with the power generator.

In another aspect, the system may additionally include a steam drum, operatively coupled between the steam hood and the steam turbine, configured to convert high temperature high pressure water from the steam hood into saturated steam, and a super heater, operatively coupled between the steam drum, and the steam turbine, configured to super heat and unsaturated the steam.

In addition to the above recited elements, the system of the present invention may additionally include a particulate removal unit, operatively coupled between the steam hood, and the power recovery expander, configured to remove particulates from the off gases. In one aspect, the particulate removal unit may be a cyclone or conventional dust extractor. In another aspect, the particulate removal system may be an electrostatic precipitator.

While the power recovery expander is operatively coupled to the boiler unit, it may also be operatively coupled to the super heater, such that a portion of the off gases is directed to the super heater and combusted. As such, the off gases provide a source of fuel for conditioning the saturated steam to become suitable for use in a steam turbine.

The system of the present invention may also include a scrubbing unit, operatively coupled to the boiler unit, configured for scrubbing sulfur from the off gases received from the boiler unit. In one aspect, the scrubbing unit may be a wet scrubber. In another aspect, the scrubbing unit may be a dry scrubber.

There has thus been outlined, rather broadly, various features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

DETAILED DESCRIPTION

Figure 1:
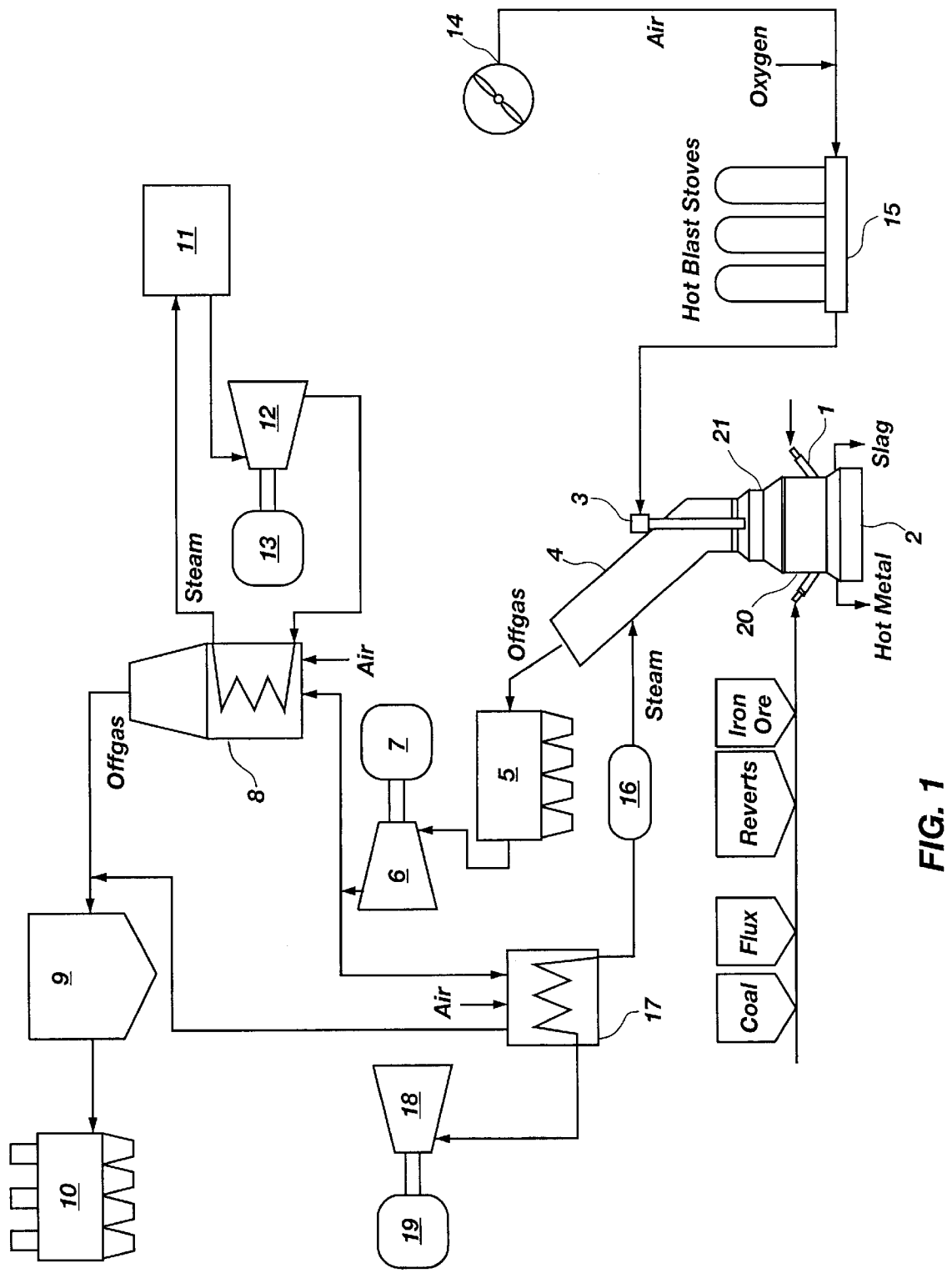
FIG. 1 is a flow chart showing the various steps of a process and system for harvesting the off gases resulting from a direct iron making process in accordance with one embodiment of the present invention.

Before the present direct iron making methods and devices are disclosed and described, it is to be understood that this invention is not limited to the particular process steps and materials disclosed herein, but is extended to equivalents thereof as would be recognized by those ordinarily skilled in the relevant arts. It should also be understood that terminology employed herein is used for the purpose of describing particular embodiments only and is not intended to be limiting.

A. Definitions

In describing and claiming the present invention, the following terminology will be used.

The singular forms "a," "an," and "the" include plural referents unless the context clearly dictates otherwise. Thus, for example, reference to "a gas" includes reference to one or more gases, and reference to "an extraction system" includes reference to one or more of such extraction systems.

As used herein, "off gas," or "off gases" refers to the hot gases which are produced during a direct iron making process utilizing a fuel other than coke, such as coal and/or natural gas. Such off gases may have a temperature of from about 2000° F. to about 3000° F. and may include such elements as CO, $CO_2$, $H_2$, $H_2O$, $N_2$, $SO_2$, $H_2S$, COS, C, Fe, FeO, $Fe_2O_3$, $Fe_3O_4$, SiO2, $Al_2O_3$, CAO, MGO, and S particulates, etc.

As used herein, "heat energy" refers to energy that may be transferred directly from one material to another as heat, without using a chemical reaction to produce the heat energy.

As used herein, "pressure energy" refers to energy that is released during a change in pressure of a material from a higher pressure to a lower pressure.

As used herein, "chemical energy" refers to energy that is released by a chemical reaction between two or more materials to produce heat, or another form of energy for transfer. By way of example without limitation, a transfer of chemical energy may be performed by combusting one material to heat another material, and therefore transfer heat energy.

Concentrations, amounts, temperatures, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited.

For example, a temperature range of about 800° F. to about 3000° F. should be interpreted to include not only the explicitly recited concentration limits of 800° F. to about 3000° F., but also to include individual temperatures such as 900° F., 1000° F., 2000° F., and sub-ranges such as 1000° F. to 1500° F., 2000° F. to 2500° F., etc. The same principle applies to ranges reciting only one numerical value, such as "less than about 3000° F.," which should be interpreted to include all of the above-recited values and ranges. Further, such an interpretation should apply regardless of the breadth of the range or the characteristic being described.

B. The Invention

The off gases produced by many direct iron making processes or smelters often contain up to 50% of the energy produced by the fuel energy source, such as coal or natural gas. The non-use or ineffective use of this off gas energy reduces the efficiency, and therefore economic value, of the iron making process. The present invention provides systems and methods for recapturing and utilizing all of the energy sources contained in the off gases (such as heat, pressure, and chemical energy), and for simultaneously controlling the off gases to enhance the direct iron making process.

Referring now to FIG. 1, is shown a schematic flow chart of a direct iron making process, which includes a system and methods for harvesting heat, pressure, and chemical energy contained in the off gases produced by the iron making process in accordance with the present invention. As shown, pulverized coal, iron ores, fluxes, and other materials are pneumatically injected at high velocity through a number of inclined lances 1, into the direct iron making smelter 2, as is known to those skilled in the art. Any type of known direct iron making process that produces a significant amount of energy containing off gases may be used. The smelter contains a liquid iron bath (not shown) into which the injected materials penetrate. Once in the liquid iron bath, the coal carbon rapidly dissolves to react with the oxide content of the iron ore. Due to the heat and pressures of the carbon and oxide reactions, the iron bath erupts various gases that are propelled into a post combustion zone 20, above the smelter hearth 21. Entrapped within the erupting gases are liquid slag and iron droplets.

Air is propelled from an air source 14, and enriched with oxygen, and then heated to a high temperature using hot blast stoves 15. One or more vertical hot blast lances 3 inject the high temperature 1500° F. to 2400° F. oxygen enriched air into the post combustion zone 20 to further combust the erupting coal gases. Such combustion encapsulates and superheats the slag and iron droplets. After being heated and encapsulated, the slag and iron droplets descend back into the iron bath due to the force of gravity, and deliver additional high temperature heat for the ongoing endothermic coal iron ore reactions in the bath. The slag and hot metal are then drawn off of the smelter as indicated.

The off gases exit smelter 2, at a temperature of from about 2000° F. to about 3000° F., and include such elements as CO, $CO_2$, $H_2$, $H_2O$, $N_2$, $SO_2$, $H_2S$, and COS, with entrained levels of C, Fe, FeO, $Fe_2O_3$, $Fe_3O_4$, $SiO_2$, $AL_2O_3$, CaO, MgO, and S dust, the sulfur being chemically combined with the iron, calcium, and magnesium. As the off gases leave the smelter, they are cooled using a steam hood 4, as known to those skilled in the art, which may be equipped with a water injection system or other suitable means of lowering the temperature of the gases to a temperature below either 900° F. or 1400° F.

The steam hood 4 may be any conventional steam hood known to those skilled in the art, wherein an outer shell is filled with flowing pressurized water which progressively cools the off gas temperature. The flowing water absorbs a large amount of heat energy from the gas, as evidenced by the cooling effect. The heat energy which is transferred from the off gases to the water may be used to create steam, which can be used to turn a steam turbine and produce electricity with a power generator, as will be more fully described below.

The rate of deployment of the off gases from steam hood 4 may be controlled using a valve or other flow regulating mechanism (not shown). The control of deployment may be used for several purposes. First, the deployment rate may be varied in order to control the amount of heat transfer that the off gases undergo. Thus, the temperature of the off gases when released from the steam hood may be controlled by the flow rate mechanism. Second, the flow output mechanism may be used to regulate the amount of pressure in the smelter 2. Many direct iron making processes are carried out at above-atmospheric pressure levels. Such an elevated pressure increases the efficiency of the smelting process by driving the smelter reactions both in the iron bath and in the post-combustion zone. The pressure regulating mechanism, or valve, may be controlled by any typical logic controller known to those skilled in the art.

After the gases have been cooled, they may be cleaned using a cleaner 5, which may be coupled to the steam hood 4. The cleaner may be either a cyclone dust extractor, or an electrostatic precipitator, which are both modules known to those skilled in the art. If the cleaner is a cyclone dust extractor, the temperature of the off gases should be below about 1400° F. If the cleaner is an electrostatic precipitator, then the temperature of the off gases should be below about 900° F.

Once the off gases have been cooled to the appropriate temperature and cleaned using the cleaner 5, they flow through a power recover expander 6, which is operatively coupled to the steam hood 4, through the cleaner. The power recovery expander may be any typical power recovery expander known to those skilled in the art, which is capable of transferring pressure energy to a power generator 7. Essentially, the power recovery expander works like a gas driven turbine, which in expanding and lowering the off gas pressure, through one or more rotor blades which turn a turbine shaft. As the expanded shaft rotates, electricity is produced by an attached power generator 7. The pressure recovery expander unit may be controlled by any logic controller known to those skilled in the art, and may be used to control the pressure of the off gases in the system, both before and after the pressure regulator. As such, the pressure recovery expander may be used to control the off gases' pressure in the steam hood 4, rather than a valve as described above.

The off gas exhausting from the expander 6, has a temperature of about 600° F. and pressure of about 18" water gauge (W.G.), which are suitable conditions for combustion in a conventional boiler. When exiting the expander, the gases have a comparatively low calorie value of between 65 to 85 BTU per scf. Therefore, the exit temperature of about 600° F. significantly aids in combustion of the gas and increases the flame temperature.

A boiler unit 8, and a super heater 17 are operatively coupled to the power recover expander 6, and receive the off gases therefrom. Further, the boiler unit and super heater are operatively coupled to first and second steam turbines 18 and 12 respectively, which are coupled in turn to power generators 13 and 19 respectively. FIG. 1, also shows the boiler unit coupled to the second steam turbine through a steam header 11. The off gases may be combusted at the boiler unit and the super heater to transfer the chemical energy from the off gases into the water in the boiler, and into the saturated steam in the super heater. The heating of the pressurized water and the saturated pressurized steam creates a superheated steam that is suitable to drive the steam turbines, and thus, to generate electricity with the power generators.

Once combusted in the boiler 8, or the super heater 17, the off gases are sent for final cleaning, as known to those skilled in the art, before release into the atmosphere. Particularly, the off gases may be directed through a scrubber 9, where they are either wet scrubbed or dry scrubbed and subsequently cleaned using a conventional bag house 10.

Referring again to FIG. 1, pressurized water flowing through an outer shell of the steam hood 4, receives sensible heat energy which is transferred from the off gases and results in the effect of cooling the off gases. By absorbing the heat energy, the water leaving the steam hood becomes superheated and is flashed in a steam drum 16, coupled to the steam hood, in order to produce saturated steam. The saturated steam then flows to the super heater 17, which is coupled to the steam drum. Low pressure off gases from the expander 6, can be combusted at the super heater to super heat the saturated steam as described above, and make the saturated steam acceptable for use in turning the steam turbine 18.

Figure 2:
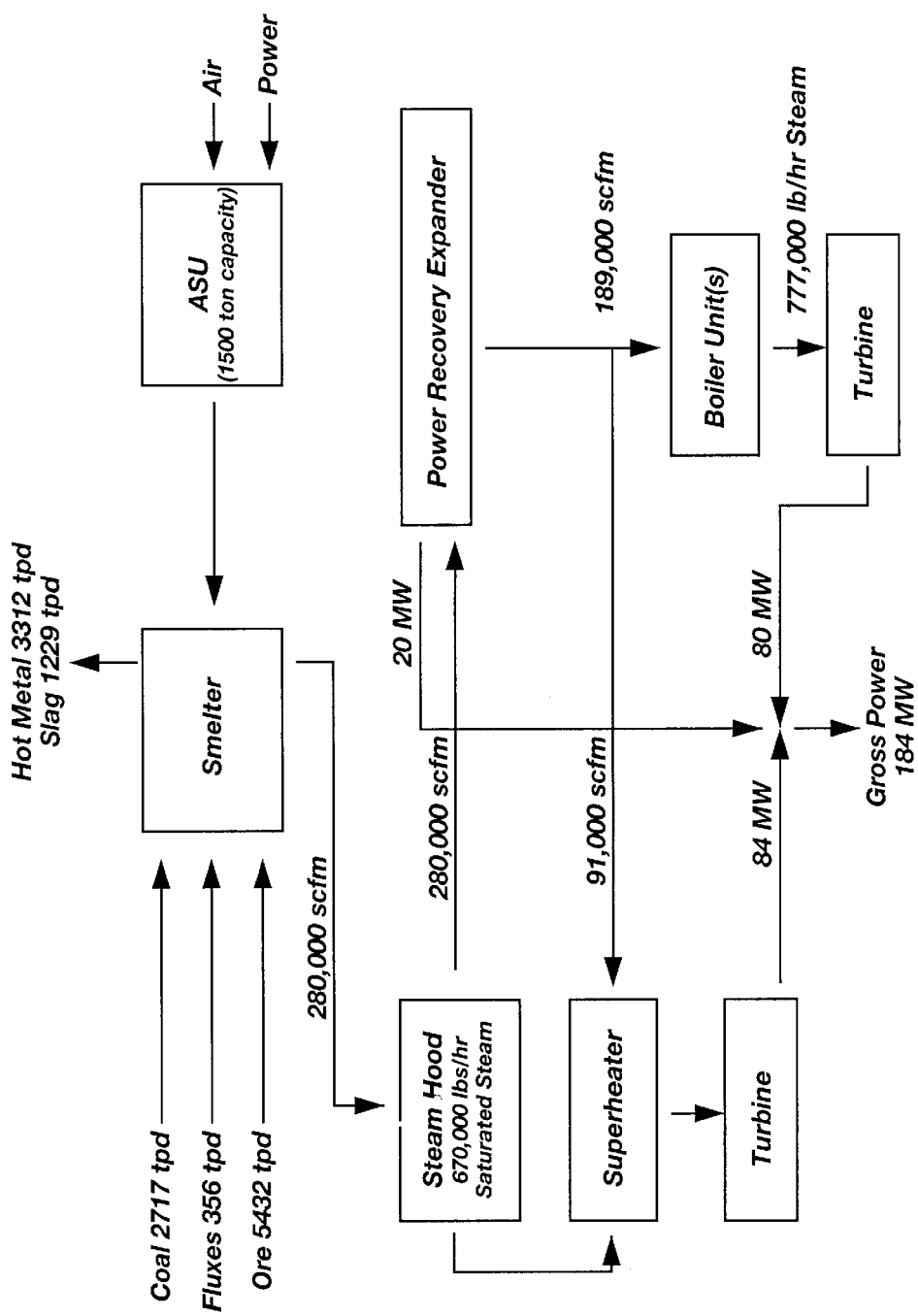
FIG. 2 is a flow chart showing a computed material and energy output for one embodiment of a direct iron making process in accordance with the present invention, at a one million ton per year or greater iron throughput.

Referring now to FIG. 2 is shown an energy flow diagram of a system for harvesting energy from direct iron making off gases in accordance with the present invention. The shown process conditions show a materials input of 2,717 tons per day (tpd) of coal, 356 tpd fluxes, and 5432 tpd of iron ore. Further, hot oxygenated air is input as required using the 1,500 ton capacity Air Separating Unit. The resultant metal production output achieves 3,312 tpd of hot metal, and 1,229 tpd of slag.

The operation of the smelter at the above-recited input levels generates approximately 280,000 standard cubic feet per minute (scfm) of heated off gases. Cooling the off gases using the steam hood results in the transfer of a sufficient amount of heat energy to produce approximately 670,000 lbs/hr of saturated steam.

After leaving the steam hood, the off gases pass through the power recovery expander where the pressure energy is transferred to the accompanying power generator (not shown in FIG. 2). The electrical output achieved is approximately 20 megawatts (MW).

Of the approximately 280,000 scfm of off gases leaving the power recovery expander, about 189,000 scfm are directed to the boiler unit for combustion. The remaining 91,000 scfm of off gases are directed to the super heater for combustion. The harvest and transfer of chemical energy via combustion of the 189,000 scfm of off gases in the boiler unit results in the production of approximately 777,000 lb/hr of steam. By inputting this amount of steam into the attached steam turbine, the accompanying power generator (not shown in FIG. 2) generates about 80 MW of electricity.

The combustion of the 91,000 scfm of off gases at the super heater is sufficient to condition the saturated steam contained therein into an unsaturated or superheated form that is suitable for use in a steam turbine. The steam output from the super heater turns the attached turbine and results in the production of approximately 84 MW of electricity.

By combining the electricity produced by all three of the generators in the present system at the present input rates and amounts, and with the assumed efficiencies, a total gross power output of 184 MW is achieved. This electricity may be utilized for the further operation of the direct iron making process, or for any other desired purposes. Thus, the direct iron making process may be made substantially more efficient.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of harvesting energy sources contained in off gases resulting from a direct iron making process, comprising the steps of:
   a) transferring heat energy from the off gases of the direct iron making process to water to create steam and tune a steam turbine coupled to a power generator that produces electricity;
   b) transferring pressure energy from the off gases of the direct iron making process to a power recovery expander coupled to a power generator that produces electricity; and
   c) transferring chemical energy from the off gases of the direct iron making process to water by combusting the off gases to create steam and turn a steam turbine coupled to a power generator that produces electricity.

2. The method of claim 1, wherein the step of transferring heat energy includes superheating the water.

3. The method of claim 2, further comprising the steps of:
   a) converting the superheated water to saturated steam;
   b) super heating the saturated steam in a super heater; and
   c) turning a steam turbine connected to a power generator with the super heated steam to generate electricity.

4. The method of claim 3, wherein the step of super heating further comprises the step of:
   transferring chemical energy from the off gases to the saturated steam in the form of heat by combusting the off gases.

5. The method of claim 1, further comprising the step of:
   removing particulate matter from the off gas prior to the step of transferring pressure energy.

6. The method of claim 5, wherein the step of removing particulate matter includes using a cyclone dust extractor.

7. The method of claim 5, wherein the step of removing particulate matter includes using an electrostatic precipitator.

8. The method of claim 1, further comprising the step of:
   scrubbing the off gases to remove sulfur following the step of combusting the off gases.

9. The method of claim 8, wherein the step of scrubbing includes wet scrubbing.

10. The method of claim 8, wherein the step of scrubbing includes dry scrubbing.

11. A system for harvesting energy from off gases produced by a direct iron making smelter comprising:
    a) a steam hood, configured to be operatively coupled to the smelter and configured to transfer heat energy from the off gases of the direct iron making smelter into water and create steam;
    b) a first steam turbine and power generator, operatively coupled to the steam hood, configured to receive steam from the steam hood, and generate electricity;
    c) a power recovery expander and power generator, operatively coupled to the steam hood, configured to receive the off gases from the steam hood, and generate electricity;
    d) a boiler unit, operatively coupled to the power recovery expander, configured to receive the off gases from the power recovery expander, and to create steam by combusting the off gases in the boiler unit; and
    e) a second steam turbine and power generator, coupled to the boiler unit, configured to receive steam from the boiler unit and generate electricity.

12. The system of claim 11, further comprising:
    a steam drum, operatively coupled between the steam hood and the first steam turbine, configured to convert high temperature, high pressure water from the steam hood into saturated steam; and
    a super heater, operatively coupled between the steam drum, and the first steam turbine, configured to super heat and unsaturate the steam.

13. The system of claim 1, further comprising:
    a particulate removal unit, operatively coupled between the steam hood and the power recovery expander, configured to remove particulates from the off gases.

14. The system of claim 13, wherein the particulate removal unit is a cyclone dust extractor.

15. The system of claim 13, wherein the particulate removal system is an electrostatic precipitator.

16. The system of claim 12, wherein the power recovery expander is operatively coupled to the super heater, such that a portion of the off gases is directed to the super heater and combusted.

17. The system of claim 11, further comprising a scrubbing unit, operatively coupled to the boiler unit, configured for scrubbing sulfur from the off gases received from the boiler unit.

18. The system of claim 17, wherein the scrubbing unit is a wet scrubber.

19. The system of claim 17, wherein the scrubbing unit is a dry scrubber.

20. A system for harvesting energy from off gases produced by a direct iron making process, the system comprising:
    a) a direct iron smelter which produces off gases;
    b) a steam hood, operatively coupled to the smelter, configured to transfer heat energy from the off gases into water and create steam;
    c) a first steam turbine, operatively coupled to the steam hood, configured to receive the steam from the steam hood;
    d) a power generator, coupled to the steam turbine, configured to generate electricity;
    e) a power recovery expander, operatively coupled to the steam hood, configured to receive the off gases from the steam hood;
    f) a power generator, coupled to the power recovery expander, configured to generate electricity;
    g) a boiler unit, operatively coupled to the power recovery expander, configured to receive the off gases from the power recovery expander, and to transfer chemical energy from the off gases to water in the boiler unit in the form of heat, by combusting the off gases; and
    h) a second steam turbine and power generator, coupled to the boiler unit, configured to receive steam from the boiler unit and generate electricity with the power generator.

* * * * *